(No Model.)
5 Sheets—Sheet 1.
W. GARDNER.
MACHINE GUN.
No. 245,710. Patented Aug. 16, 1881.
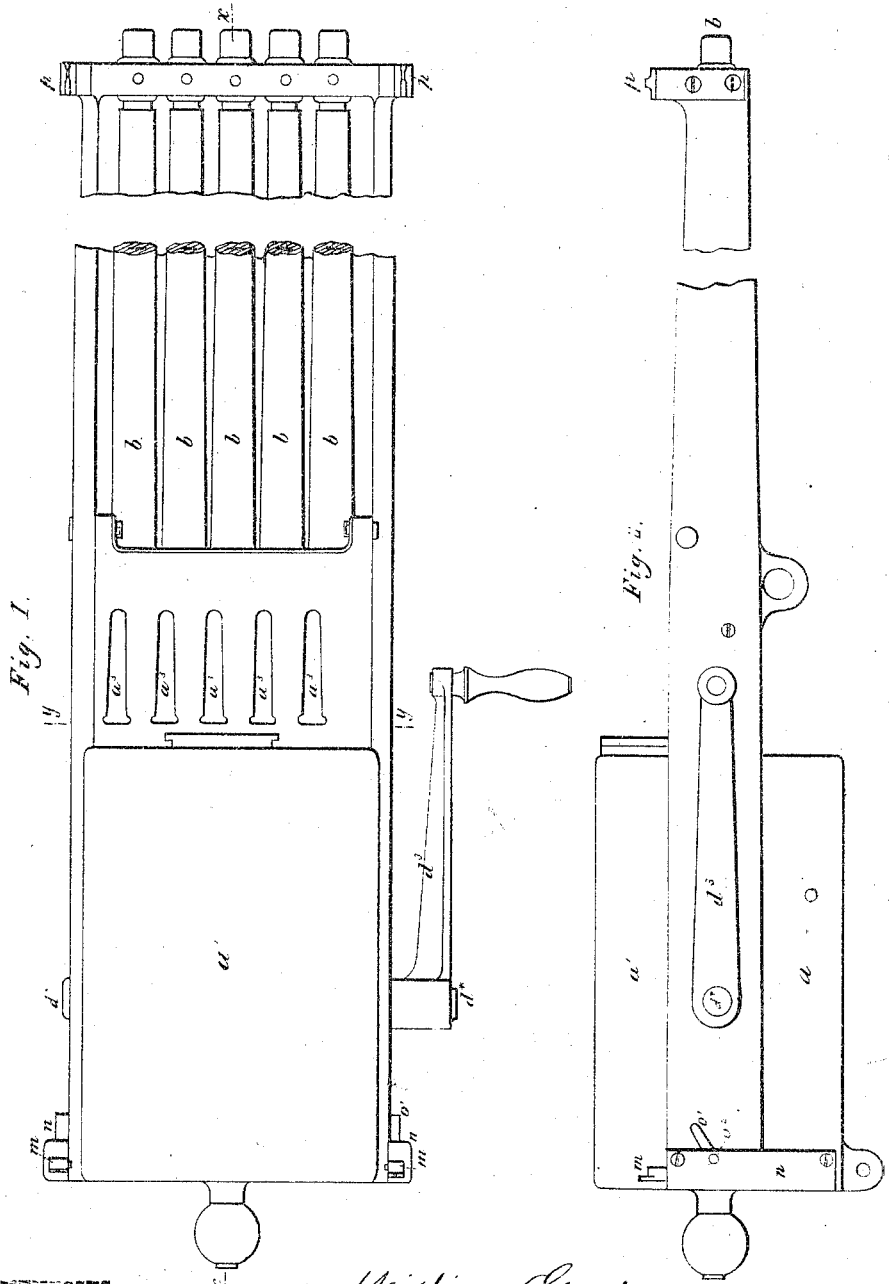
WITNESSES
INVENTOR
William Gardner
By Leggett & Leggett
ATTORNEYS (No Model.) 5 Sheets—Sheet 2.
W. GARDNER.
MACHINE GUN.
No. 245,710. Patented Aug. 16, 1881.
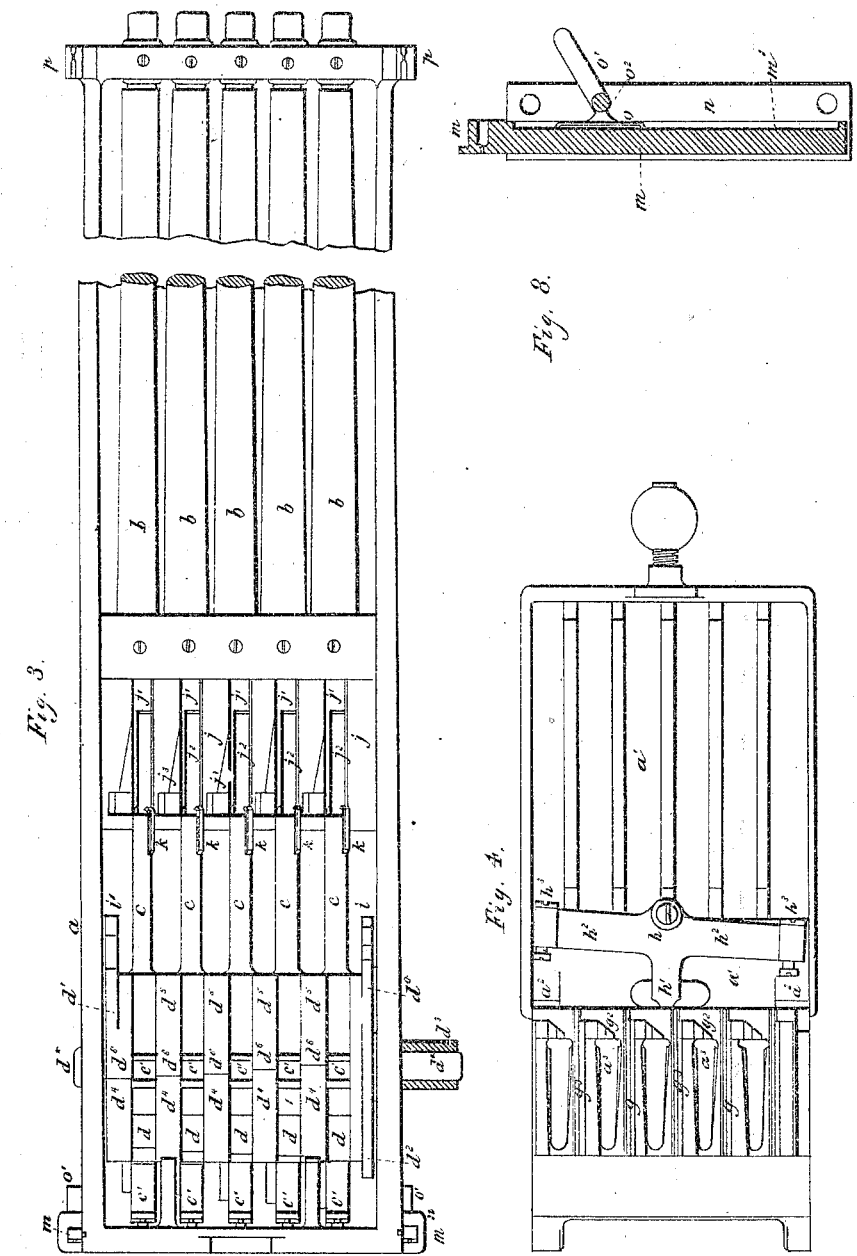
WITNESSES
W. Engel
Jno. Crowell Jr
INVENTOR
Wm Gardner
By Leggett & Leggett
ATTORNEYS (No Model.) W. GARDNER. 5 Sheets—Sheet 3.
MACHINE GUN.
No. 245,710. Patented Aug. 16, 1881.
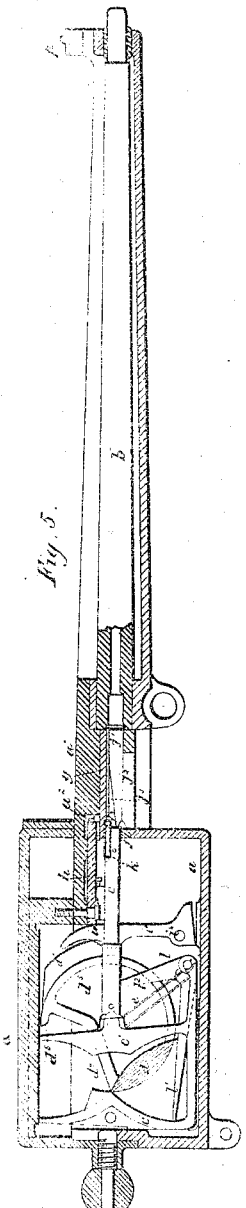
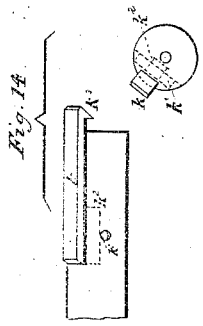
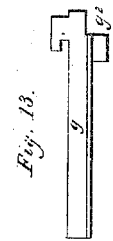
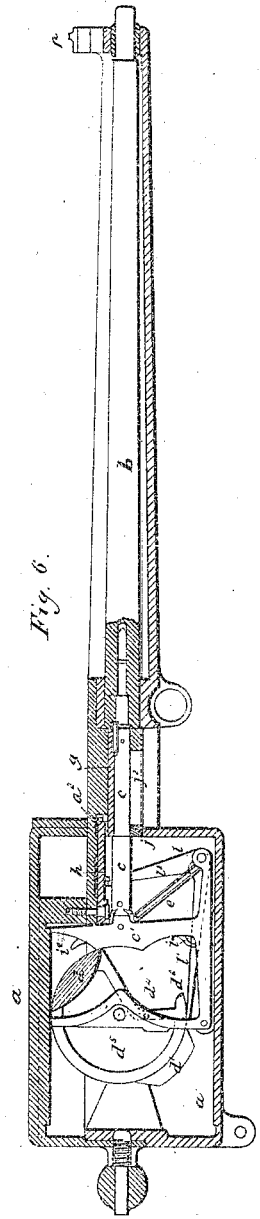
WITNESSES
INVENTOR
Wm Gardner
By Liggett & Liggett
ATTORNEYS (No Model.)  5 Sheets—Sheet 4.
W. GARDNER.
MACHINE GUN.
No. 245,710.  Patented Aug. 16, 1881.
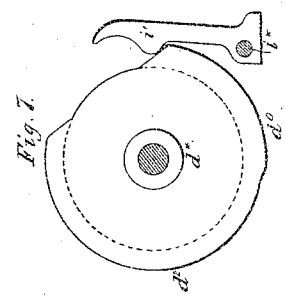
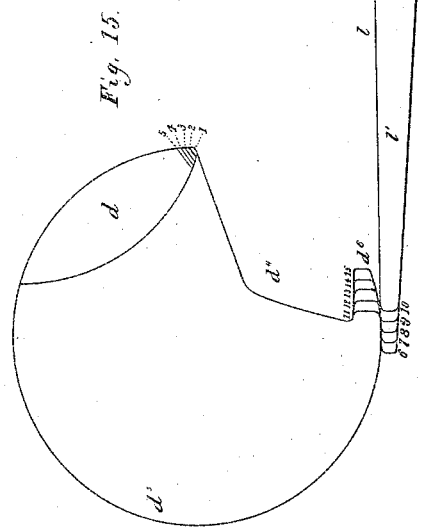
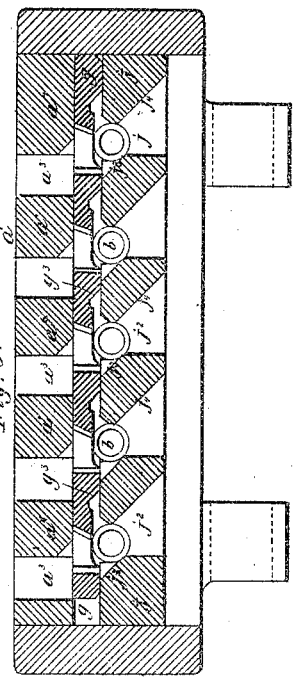
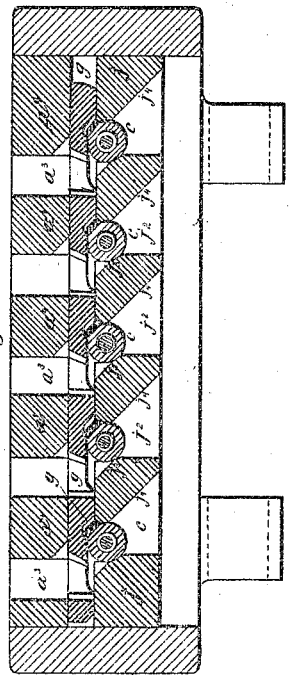
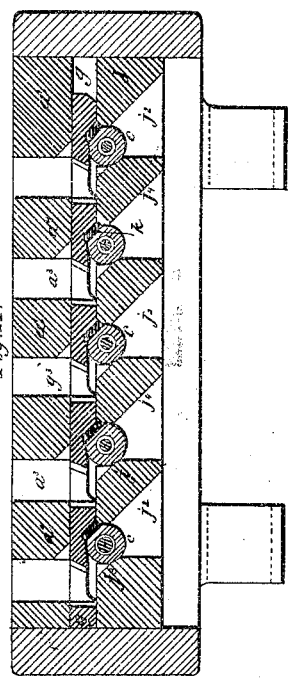
Witnesses:  
Geo. D. Seymour  
Albert L. Lawrence
Inventor:  
Wm. Gardner  
by Leggett and Leggett (No Model.)  W. GARDNER.  5 Sheets—Sheet 5.
MACHINE GUN.
No. 245,710.  Patented Aug. 16, 1881.
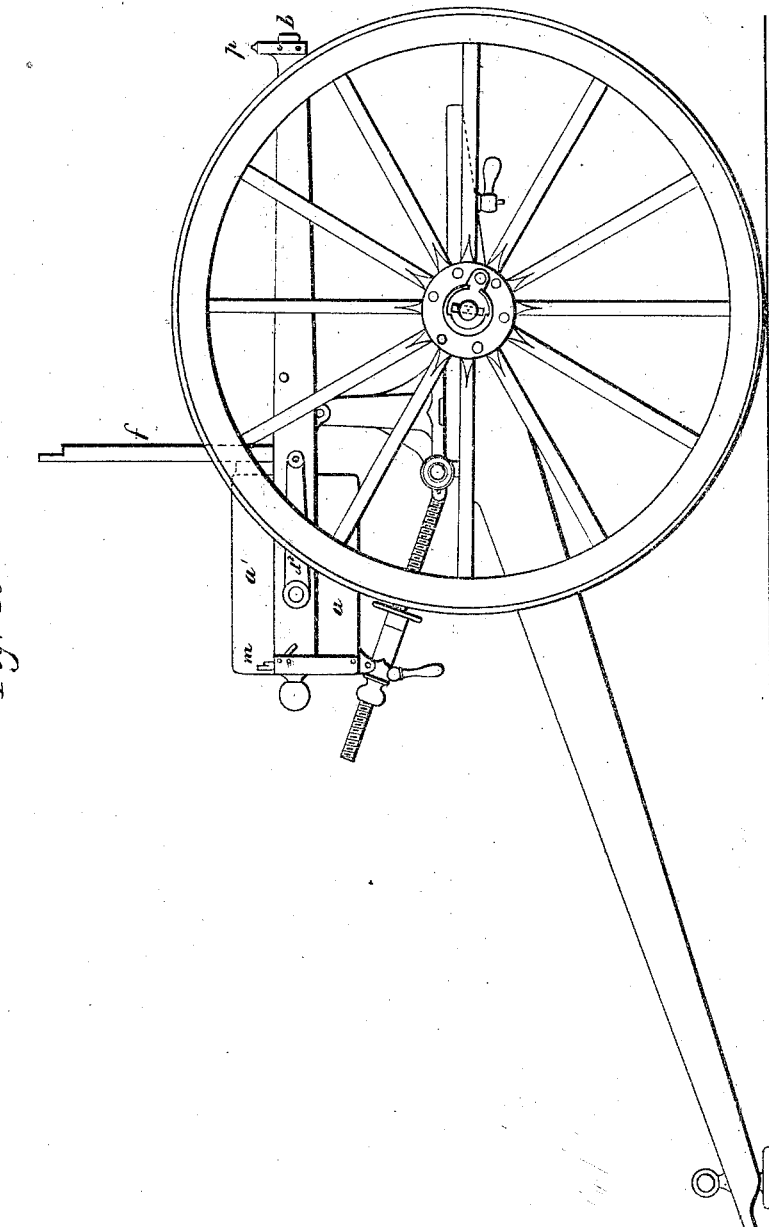
WITNESSES  INVENTOR

UNITED STATES PATENT OFFICE.

WILLIAM GARDNER, OF HARTFORD, CONNECTICUT.

MACHINE-GUN.

SPECIFICATION forming part of Letters Patent No. 245,710, dated August 16, 1881.

Application filed April 16, 1881. (No model.)

*To all whom it may concern:*

Be it known that I, WILLIAM GARDNER, of Hartford, Connecticut, United States of America, have invented new and useful Improvements in Machine-Guns, of which the following is a specification, reference being had to the accompanying drawings.

This invention relates to improvements in machine-guns of the class described in the specifications of former Letters Patent dated February 29, 1876, No. 174,130, and June 10, 1879, No. 216,266, and is more especially designed to adapt the mechanism therein described to guns which have a series of barrels, by the incorporation therewith of various novel devices, as hereinafter described, whereby I provide arms of this class which will be highly efficient and very conveniently operated under all circumstances.

My invention is illustrated in the accompanying drawings, in which Figure 1 is a plan or top view of a gun having five barrels with my present improvements applied to the same, and Fig. 2 is a side elevation of the said gun. Fig. 3 is a plan or top view of my improved gun with the cover and the parts supported thereby removed, and Fig. 4 is an under-side view of the said cover and parts. Fig. 5 is a longitudinal section of the said gun on the line $x\ x$, Fig. 1; and Fig. 6 is a similar section with the parts in a different position. Fig. 7 is a side elevation of one of the cams and pivoted levers for imparting the requisite movement to the sliding plate or slide, hereinafter described. Fig. 8 is a vertical section, drawn to an enlarged scale, of my improved sighting device. Figs. 9, 10, and 11 are transverse sections, drawn to an enlarged scale, on the line $y\ y$, Fig. 1, showing the sliding plate or slide in the various positions it occupies during the manipulation of the gun. Fig. 12 is an end view, and Fig. 13 a side view, of the said sliding plate or slide. Fig. 14 represents a side view and end view, drawn to an enlarged scale, of the forward end of the plunger, hereinafter described, and the relative position of the extractor with regard to such plunger; and Fig. 15 is a diagram, hereinafter described. Fig. 16 is a side elevation, drawn to a reduced scale, of the said gun mounted upon its carriage.

Like letters indicate the same parts throughout the drawings.

$a$ represents the breech frame or case, constructed of gun-metal, brass, iron, or other suitable metal, and provided with a hinged cover, $a'$.

$b\ b$ represent the barrels, which may be of any suitable bore and length, and which are screwed in or otherwise securely attached to the front of the breech frame or case $a$.

According to this invention I employ a series of breech pins or plungers, $c$, each of which is provided with U-shaped extensions $c'$ to receive the wrist or crank pin $d$, whereby it receives motion from the crank $d^3$, as described in the specifications of the said former Letters Patent, and I also retain the firing-pin, the mainspring $e$, and some of the other parts used in the guns as therein described; but in order to adapt the said parts to guns having a series of barrels which may be fired either in a volley, alternately, or in pairs, I modify certain parts of the said guns, as will appear from the following description:

One important feature of this invention consists in the mechanism for receiving the cartridges from the vertical cartridge feeder or reservoir $f$, Fig. 16, and causing them to pass or drop simultaneously in front of the plungers $c$, to be forced forward by the same into the barrels. For this purpose I employ a sliding plate or slide, $g$, which is free to move transversely across the space immediately at the rear of the barrels $b$, and which is supported in suitable bearings or guides, $a^2$, upon the under surface of the hinged cover $a'$ of the gun. Through this cover suitable apertures, $a^3$, are formed, to permit the cartridges to fall from the vertical cartridge-feeder (provided with as many channels as there are barrels) upon the said slide. To impart the requisite transverse movement to this slide, I combine with the same a pivoted T-shaped lever, $h$, one arm, $h'$, of which enters a recess or notch, $g'$, in the said slide. The other arms, $h^2$, of the said lever are provided with adjustable studs or bolts $h^3$, upon which two levers, $i\ i'$, pivoted to the breech frame or case $a$, impinge. These levers are acted upon alternately, and are caused to rock upon their fulcrums $i^*$ by two independent cams, $d'\ d^2$, one at each end of the crank-shaft $d^3$, and through the aforesaid T-shaped lever $h$ impart the requisite movement to the slide $g$, as above stated, to effect the supply of cartridges to the barrel in a uniform and expeditious manner. In some cases I dispense with the levers $i$ $i'$ and arrange the cams to act directly upon the lever $h$.

Below the slide $g$, and attached to or forming part of the breech case or frame, I provide a bed-plate, $j$, having as many grooves $j'$ as there are barrels. Within these grooves the plungers $c$ work to and fro, the said grooves having apertures $j^2$ through their bottom to permit the passage or ejection of the exploded cartridge-shells. The aforesaid slide $g$, the bed-plate $j$, and the apertures $a^3$ in the cover are suitably inclined or beveled, as shown at $g^2$, $j^3$, $j^4$, and $a^4$, to facilitate the feeding of the full cartridges and the ejection of the exploded cartridge-shells.

One very important feature of this invention is the positive character of the action of the extractors. Each extractor $k$ is attached to its plunger by a pin, $k'$, passing through a lug or projection, $k^2$, on the said extractor, and is prevented from any endwise movement, but is free to move slightly outward to allow its hook or claw $k^3$ to pass over the flange or rim of the cartridge when necessary. In combination with each of these extractors, I provide on the aforesaid sliding plate or slide a beveled or inclined surface, $g^3$, which, as the plunger moves forward to insert a cartridge in the barrel, occupies the position shown in Fig. 10, and permits the said extractor to move outward and over the rim or flange of the said cartridge, providing such rim should not have passed behind the hook or claw of the extractor prior to the forward movement of the plunger. When, however, the cartridge is fired, and prior to the commencement of the backward stroke of the plunger, the sliding plate $g$ is caused to move laterally to a slight extent to the position shown in Fig. 11, by the action of the portion $d^0$ of the cam $d^2$ upon the T-shaped lever $h$, through the pivoted lever $i'$, and the beveled surface $g^3$ of the said plate then prevents any outward movement of the free end of the extractor in such rearward movement of the plunger, thereby insuring the proper and positive extraction of the exploded cartridge-shell. The aforesaid cams $d'$ $d^2$, and the parts $i$ $i'$ $h$ operated thereby, are relatively so arranged that the movements of the sliding plate $g$ and plungers $c$ are as follows: that is to say, when the plungers are in their rearmost position, as shown in Figs. 3 and 5, and the crank-handle $d^3$ is turned, the slide first moves transversely below the feed-apertures $a^3$ in the cover $a'$, into the position shown in Fig. 9, and carries the lowermost cartridges (which then rests upon the upper surface of the bed-plate $j$, and at one side of the grooves $j'$ within the same) over the said grooves $j'$, into which such cartridges fall. On a further movement of the crank or handle the slide is drawn back into the position shown in Fig. 10, and permits the next cartridges to assume the position previously occupied by those now in front of the plungers. The plungers then move forward, and as soon as the cartridges are fully inserted within the barrels the slide receives a further backward movement into the position shown in Fig. 11, and the beveled surface $g^3$ prevents any outward movement of the extractors, as above explained. The plungers then move back, and the empty cartridges fall through the apertures $j^2$ in the bed-plate, or are forced therethrough in the next movement of the slide by the inclined surfaces $g^2$ upon the same.

In order to facilitate the working of my improved gun, in which the feeding of the cartridges to all of the barrels takes place simultaneously, as above described, and to obviate any excessive strain upon the crank which might arise, providing the commencement of the extraction of all the cartridge-shells took place at one and the same time, I provide means for the consecutive extraction of the cartridges by cutting away to a slight extent each succeeding crank-pin $d$, which acts upon the U-shaped portion of each plunger, as shown at 1, 2, 3, 4, and 5 in Fig. 15, so that in the working of the gun the cartridge-shell in one barrel is started in a rearward direction in its chamber before the cam in connection with the plunger of the next barrel comes in contact with the U-shaped portion $c'$ of the said plunger. In this manner I insure the successive extraction of the empty cartridge-shells, and thereby prevent the necessity for excessive exertion by the operator consequent upon the accidental sticking or binding of one or more of the shells in either of the cartridge-chambers.

To provide for firing the gun a notch, $d^4$, is cut in each of the disks $d^5$, to allow of the necessary upward movement of the long arm $l'$ of each of a series of bell-crank levers, $l$, when the parts of the gun are in the proper position for firing, as described in the specifications of the said former Letters Patent. The short arm $l^2$ of this lever projects up through a slot or opening in the plunger and enters a slot in the firing-pin. Each lever $l$ is held down by the periphery of its disk $d^5$ until the plunger $c$ has carried the cartridge forward into the barrel ready to be fired; then by the further rotation of the disk the notch $d^4$ in the same is brought into such a position as to allow the mainspring $e$ to act and cause the arm $l^2$ of the said lever to drive forward the firing-pin and explode the cartridge. In order, however, to provide for either simultaneous or alternate firing of all of the barrels, as desired, I prefer to form the long arms $l'$ of the said bell-crank levers of different lengths, as shown at 6 7 8 9 10 in Fig. 15, and to arrange the releasing-points $d^6$ on the periphery of the disks $d^5$—that is to say, the points at which the mainsprings are free to act in different positions, as shown at 11, 12, 13, 14, and 15. When it is desired to adapt the gun for simultaneous or volley firing the said levers and cams must be all so relatively arranged that each lever will be acted upon by the cam whose releasing-point is so arranged in relation to the length of the said lever as to effect the release of the mainspring operated thereby simultaneously with the release of all of the other mainsprings. In other words, the longer the arm of the lever, the more forward must be the releasing-point, whereas, if it is desired to adapt the gun to alternate or successive firing of the barrels, the said levers are so arranged that the longer levers will be acted upon by the more backward cams. By this contrivance I am enabled to adapt the gun to either volley or alternate firing with one set of levers, and by a suitable combination of the said levers with the cams I am also enabled, when desired, to fire four of the barrels in pairs—that is to say, the center barrel may be fired first, then the two barrels, one on each side of the said center barrel, and finally the two outer barrels.

I also improve the sighting devices or sights to be employed in the said guns. For this purpose I arrange upon each side of the gun, and at the rear end thereof, a sight, $m$, which may be adjusted vertically within a suitable aperture in its box or case $n$. Each of these sights is provided with a groove, $m'$, on one side, into which a flat spring, $o$, passes. This spring, under ordinary circumstances, permits the said sights to be freely adjusted vertically while at the same time it exerts sufficient force upon the sight to retain it in any desired position. In order, however, to clamp the said sight in the desired position, I combine with the spring $o$ an eccentric lever, $o'$, which, on being turned upon its fulcrum $o^2$, exerts sufficient force upon the said spring to retain the sight in position until such lever is again turned to permit the readjustment of the sight. These sights $m$ are combined with other sights, $p$, near the muzzle end of the gun, and both the front and rear sights are preferably provided with apertures, through which the operator may observe the object or objects to be aimed at, the apertures in the front sights being provided with a pin or projection to facilite such aiming. The said sights are also provided with the usual upward extensions to permit the aiming to be approximately effected prior to minutely setting the gun by the use of the aforesaid apertures.

While I have shown and described my improved sighting devices to illustrate their application to my improvement, I make no claim to the sighting devices in this patent, but reserve the right to make separate application therefor.

Although I have herein described my improvements as applied to a gun having five barrels, I wish it understood that the said improvements may be applied to guns having a greater or less number of barrels, as desired, without departing from the spirit of my invention.

What I claim is—

1. The combination, with the breech-cover, provided with apertures $a^3$, and bed-plate, provided with apertures corresponding in number to those in the cover but located in different vertical planes, said apertures being beveled, substantially as shown, whereby the cartridge takes an inclined course in its passage from the apertures in the bed-plate, of a slide, $g$, provided with apertures through which the cartridges are fed, said slide being cut away on its under side adjacent to its apertures, whereby the cartridges are retained in place for firing when the slide is in position for feeding another round of cartridges to the upper surface of the bed-plate, substantially as set forth.

2. In a machine-gun, the combination, with the plungers $c$ and U-shaped extensions $c'$, of the crank-pins located within the extensions $c'$, said crank-pins being cut away, as at 1, 2, 3, 4, and 5, substantially as set forth.

3. In a machine-gun, the combination, with the cams $d'$ $d^2$, of lever $h$ and slide $g$, substantially as set forth.

4. In a machine-gun, the combination, with the cams $d'$ $d^2$, of lever $h$, slide $g$, and levers $i$ $i$, substantially as set forth.

5. In a machine-gun, the slide $g$, provided with the beveled or inclined surfaces $g^3$, in combination with the extractors $k$ and bolts connected with the extractors, substantially as set forth.

6. In a machine gun, the bell-crank levers $l$, whose arms $l'$ are of different lengths, in combination with the disks $d^5$, having the releasing-points 11, 12, 13, 14, and 15 in different positions, whereby I provide for the simultaneous or alternate firing of the barrels, or for firing the barrels in pairs or otherwise, substantially as above set forth.

WILLIAM GARDNER.

Witnesses:
LEWIS SANDERSON,
WILLIAM CROSS,
Both of 8 Southampton Buildings, London.